United States Patent
Marrano et al.

(10) Patent No.: US 11,066,996 B2
(45) Date of Patent: Jul. 20, 2021

(54) GAS TURBINE ENGINE WITH INERTIAL PARTICLE SEPARATOR

(71) Applicant: PRATT & WHITNEY CANADA CORP., Longueuil (CA)

(72) Inventors: Roberto Marrano, Boucherville (CA); Francois Bisson, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 109 days.

(21) Appl. No.: 16/202,827

(22) Filed: Nov. 28, 2018

(65) Prior Publication Data

US 2019/0331025 A1   Oct. 31, 2019

Related U.S. Application Data

(60) Provisional application No. 62/663,508, filed on Apr. 27, 2018.

(51) Int. Cl.
| | | |
|---|---|---|
| *F02C 7/052* | (2006.01) | |
| *F02K 3/02* | (2006.01) | |
| *F02C 7/04* | (2006.01) | |

(52) U.S. Cl.
CPC ............ *F02C 7/052* (2013.01); *F02C 7/04* (2013.01); *F02K 3/02* (2013.01)

(58) Field of Classification Search
CPC . F02C 7/052; B64D 2033/0246; B64D 33/00; F05D 2260/607; B01D 45/04
See application file for complete search history.

(56) References Cited

U.S. PATENT DOCUMENTS

| | | | |
|---|---|---|---|
| 2,835,342 A | | 5/1958 | Hockert |
| 3,329,377 A | | 7/1967 | Peterson et al. |
| 3,766,719 A | | 10/1973 | McAnally |
| 3,952,972 A | | 4/1976 | Tedstone et al. |
| 4,292,050 A | | 9/1981 | Linhardt et al. |
| 4,300,918 A | | 11/1981 | Cary |
| 4,346,860 A | | 8/1982 | Tedstone |
| 4,509,962 A | * | 4/1985 | Breitman ............... B01D 45/16 137/15.1 |
| 4,527,387 A | * | 7/1985 | Lastrina ................. F02C 7/052 244/53 B |
| 4,844,382 A | | 7/1989 | Raisbeck |
| 4,860,534 A | | 8/1989 | Easley |
| 5,039,317 A | | 8/1991 | Thompson et al. |
| 5,139,545 A | * | 8/1992 | Mann ...................... F02C 7/052 55/306 |

(Continued)

FOREIGN PATENT DOCUMENTS

EP   1942258 A2   7/2008

OTHER PUBLICATIONS

European Search Report issued in counterpart application No. 19171599 dated Sep. 10, 2019.

*Primary Examiner* — William H Rodriguez
(74) *Attorney, Agent, or Firm* — Norton Rose Fulbright Canada LLP (57) ABSTRACT

There is disclosed an inertial particle separator communicating with an engine inlet. The inertial particle separator has: a main duct body; a bypass duct; and a splitter defined by an intersection of the main duct and the bypass duct. The main duct and the bypass duct having particular geometric characteristics. A method of separating particles via inertia in an aircraft engine inlet is also provided.

20 Claims, 4 Drawing Sheets

(56) References Cited

U.S. PATENT DOCUMENTS

| | | | |
|---|---|---|---|
| 5,653,880 | A | 8/1997 | Mouton |
| 6,698,180 | B2 | 3/2004 | Snyder |
| 6,817,572 | B2 | 11/2004 | Negulescu et al. |
| 7,091,470 | B2 | 8/2006 | Horikawa et al. |
| 7,678,165 | B2 | 3/2010 | Tingle et al. |
| 7,850,934 | B2 | 12/2010 | Doring |
| 7,854,778 | B2 | 12/2010 | Groom et al. |
| 8,512,450 | B2 | 8/2013 | Kazlauskas et al. |
| 8,663,350 | B2 | 3/2014 | Snyder |
| 9,046,056 | B2 | 6/2015 | Lerg |
| 9,114,347 | B2 | 8/2015 | Eyers et al. |
| 9,206,740 | B2 | 12/2015 | Wong et al. |
| 9,314,723 | B2 | 4/2016 | Judd et al. |
| 9,915,176 | B2 | 3/2018 | Murray et al. |
| 10,054,050 | B2 | 8/2018 | Labrecque et al. |
| 10,138,904 | B2 * | 11/2018 | Pearson .............. B01D 45/16 |
| 10,400,670 | B2 * | 9/2019 | Kiszewski ........... F01D 9/041 |
| 2009/0139398 | A1 * | 6/2009 | Sheoran .............. B01D 45/04 |
| | | | 95/12 |
| 2016/0123228 | A1 | 5/2016 | Couilleaux et al. |
| 2016/0265435 | A1 | 9/2016 | Snyder |
| 2016/0348585 | A1 * | 12/2016 | Marini .................. F02K 3/105 |
| 2016/0363051 | A1 | 12/2016 | Snyder et al. |
| 2017/0211475 | A1 | 7/2017 | Mayer et al. |
| 2017/0241341 | A1 * | 8/2017 | Gekht ..................... F02C 7/04 |
| 2017/0241342 | A1 * | 8/2017 | Gekht ..................... F02K 3/02 |
| 2017/0370287 | A1 * | 12/2017 | Pearson ............... B64D 33/02 |
| 2018/0058323 | A1 | 3/2018 | Smith, III et al. |
| 2018/0209340 | A1 | 7/2018 | Renninger et al. |
| 2019/0024587 | A1 * | 1/2019 | Smith, III .............. F02C 7/057 |

\* cited by examiner

GAS TURBINE ENGINE WITH INERTIAL PARTICLE SEPARATOR

CROSS-REFERENCE TO RELATED APPLICATIONS

This application claims priority from U.S. provisional patent application No. 62/663,508, filed Apr. 27, 2018, the entire content of which is incorporated by reference herein.

TECHNICAL FIELD

The application relates generally to aircraft engines and, more particularly, to an air inlet system having an inertial particle separator.

BACKGROUND OF THE ART

Air inlet systems for aircraft engines, such as gas turbine engines, are used to deliver ambient air to the engine compressor with minimum pressure loss and flow distortion (swirl and pressure distortion). Particle separators are sometimes integrated to such air Inlet systems for protecting the engine against foreign object ingestion including dust, sand, water, icing particles (including supercooled droplets), and large debris.

The particle separators typically have vanes that are actuatable from a separating configuration to a non-separating configuration. The vanes can be moved from a separating configuration to a non-separating configuration to minimize aerodynamic losses when foreign object protection is not needed. However, accommodating the separator in the inlet often further increases pressure loss, complexity, and weight.

SUMMARY

In one aspect, there is provided an inertial particle separator configured for communicating with an engine inlet of an aircraft engine having an axis, the inertial particle separator comprising: a main duct having an inlet fluidly connected to an environment outside of the aircraft engine and an outlet configured for being fluidly connected to the engine inlet, the main duct having a first side facing away from the axis and a second side opposed to the first side and facing toward the axis, the inlet for receiving an airflow from the environment along a first direction; a bypass duct stemming from the main duct between the inlet and the outlet, the bypass duct being fluidly connected to the main duct; and a splitter defined by an intersection of the main duct and the bypass duct, the splitter having a leading edge, wherein the second side of the main duct at the inlet extends from the inlet along a second direction defining an angle (a) of at most 45 degrees with the first direction, wherein, the main duct has a radially outward-most section between the inlet and the splitter, the radially-outward most section having a height (H1) extending from the first side to the second side and a width (W1), wherein W1/H1≥0.5, wherein a length (G1) from the second side to the first side and from the radially-outward most section along a direction parallel to the second direction is at least as great as the height (H1) of the main duct at the radially outward-most section, wherein a height (H2) of the main duct from the leading edge of the splitter and the second side of the main duct is at most four times the height (H1) of the main duct at the radially outward-most section, and wherein a height (S1) of the bypass duct from the first side at an end of the length (G1) to the leading edge is at least 20% of the height (H1) of the main duct at the radially outward-most section.

In another aspect, there is provided an aircraft engine having an inertial particle separator communicating with an engine inlet of the aircraft engine, the inertial particle separator comprising: a main duct having an inlet fluidly connected to an environment outside of the turboprop or turboshaft gas turbine engine and an outlet configured for being fluidly connected to the engine inlet, the main duct having an inner main duct wall and an outer main duct wall spaced apart from the inner main duct wall; a bypass duct stemming from the main duct between the inlet and the outlet, the main duct being fluidly connected to the main duct, the bypass duct having an inner bypass duct wall and an outer bypass duct wall; and a splitter defined by an intersection of the outer main duct wall and the inner bypass duct wall, the splitter having a leading edge, wherein the duct has a first segment, a second segment, and a third segment in serial flow communication, the first segment and the second segment being located upstream of the splitter relative to a flow of air through the duct, the bypass duct located in the third segment, wherein, at an upstream end of the first segment, an angle (a) between the inner main duct wall and a reference line defined by a direction of an airflow entering the main duct ranges from 0 to 45 degrees, wherein, a cross-section of the main duct taken in a plane perpendicularly intersecting the reference line and located at an interface between the first segment and the second segment is characterized by a height (H1) and a width (W1), wherein W1/H1≥0.5, wherein a length (G1) of the second segment is defined from a first point located on the inner main duct wall at the interface between the first segment and the second segment and a second point located on the outer main duct wall, the length taken along a direction parallel to the inner main duct wall at the upstream end of the first segment, wherein G1/H1≥1.0; wherein a height (H2) of the main duct at the third segment is defined between the leading edge and the inner main duct wall, the height (H2) extending perpendicularly to both of the splitter to the inner main duct wall, wherein H2/H1≤4, wherein a height (S1) of the bypass duct is defined from the second point and the leading edge of the splitter, wherein S1/H1≥0.2.

In yet another aspect, there is provided a method of separating particles in an engine inlet of an aircraft engine, comprising: receiving a flow of ambient air in an incoming direction from an environment in a duct; directing the flow away from a centerline of the aircraft engine in a second direction defining an angle (a) of at most 45 degrees with the incoming direction up to a radially outward-most section of the duct where a width (W1) is at least 50% of a height (H1) thereof; directing the flow toward the centerline from the radially outward-most section of the duct along a portion of the duct having a length (G1) taken along the second direction thereby separating the flow in an air flow and a particle flow via inertia, the length (G1) extending from the radially-outward most section at a side of the duct facing the centerline to an opposed side of the duct facing away from the centerline, and being at least as great as the height (H1); directing the air flow in an air inlet duct having a height (H2) being at most 4 times the height (H1) of the duct at the radially-outward most section; and directing the particle flow in a bypass duct having a height (S1) being at least 20% of the height (H1) at the radially-outward most section of the duct and being defined from and end of the length (G1) to a location where the flow is separated in the air flow and the particle flow.

DESCRIPTION OF THE DRAWINGS

Reference is now made to the accompanying figures in which.

DETAILED DESCRIPTION

Figure 1:
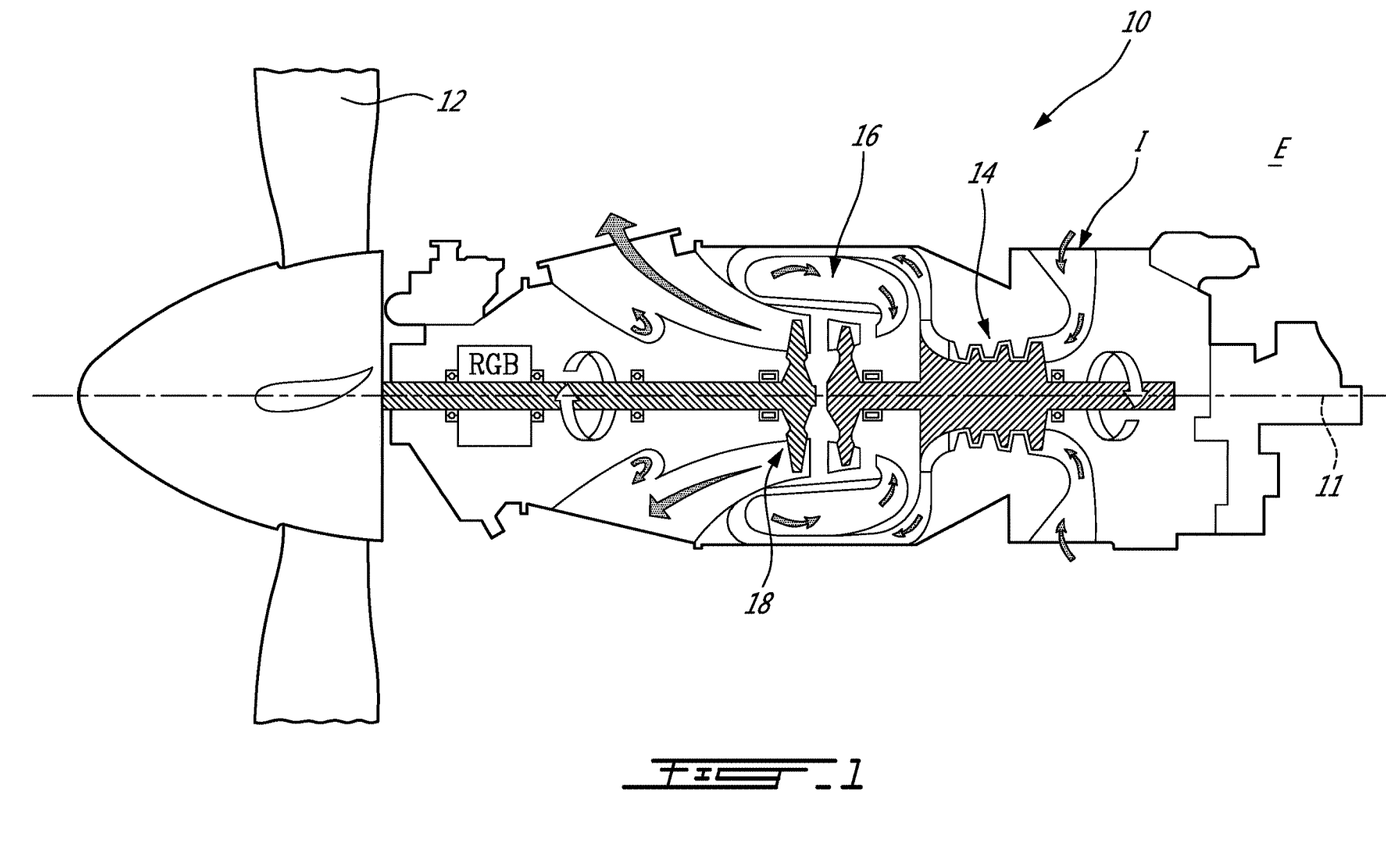
FIG. 1 is a schematic cross-sectional view of a gas turbine engine.

FIG. 1 illustrates a gas turbine engine 10 of a type preferably provided for use in subsonic flight, generally comprising a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The propeller 12, the compressor section 14, and the turbine section 18 rotate about a centerline 11 of the gas turbine engine 10. Although the gas turbine engine 10 is depicted as a turboprop, the gas turbine engine 10 may be a turboshaft or even a turbofan.

In some operating conditions, air of an environment outside of the gas turbine engine 10 may contain particles. These particles may be foreign object such as ice particles. In some cases, these particles may cause damage to the engine 10 if ingested. Hence, it may be preferable to remove the particles from the air entering the engine 10 in order to avoid damage to the components (e.g., compressor section 14) of the gas turbine engine 10. This might be achieved with an inertial particle separator that separates the foreign particles from the air by accelerating the particles and directing them with inertia toward a bypass system.

Figure 2:
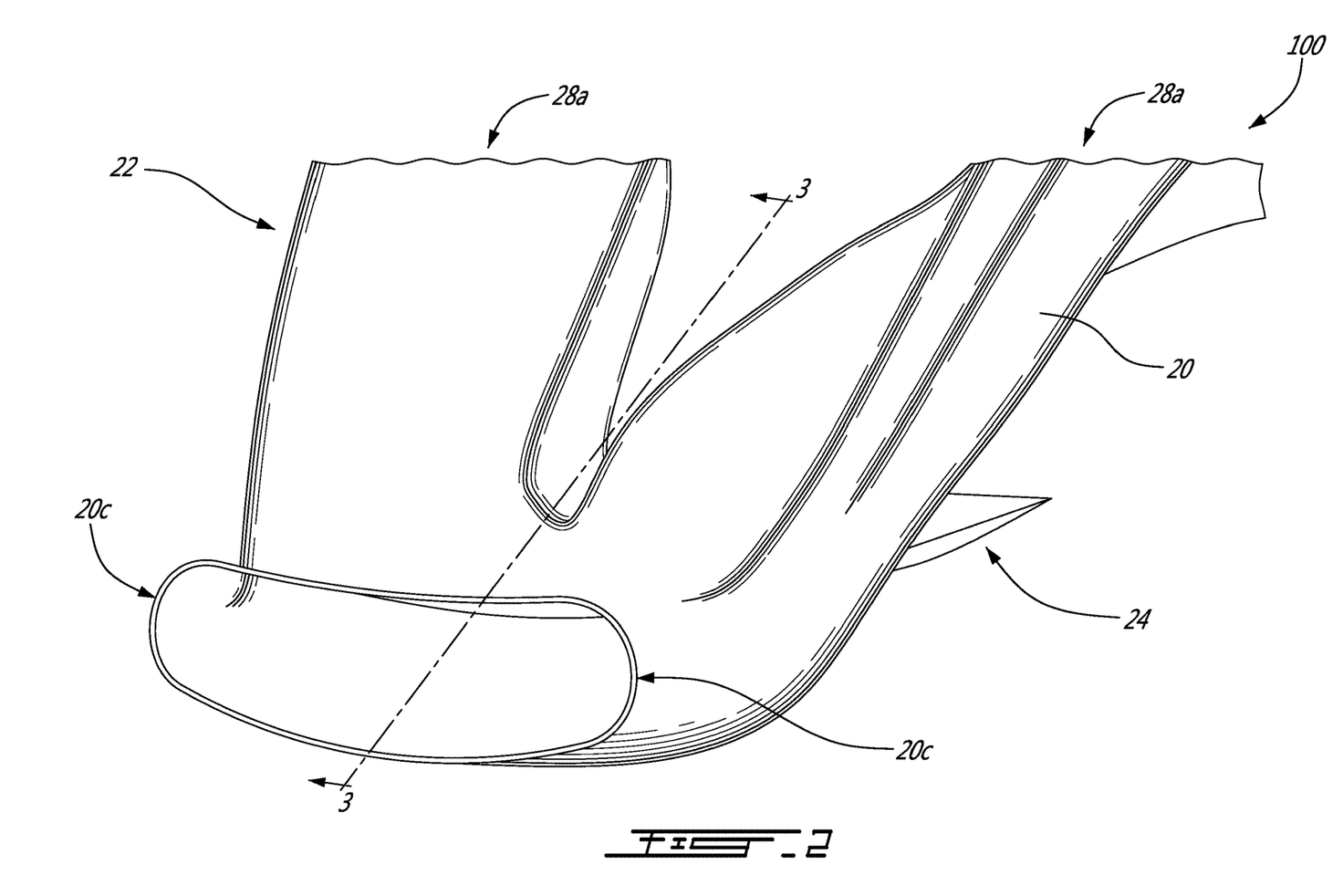
FIG. 2 is a schematic oblique view of an inertial particle separator in accordance with one embodiment.
Figure 3:
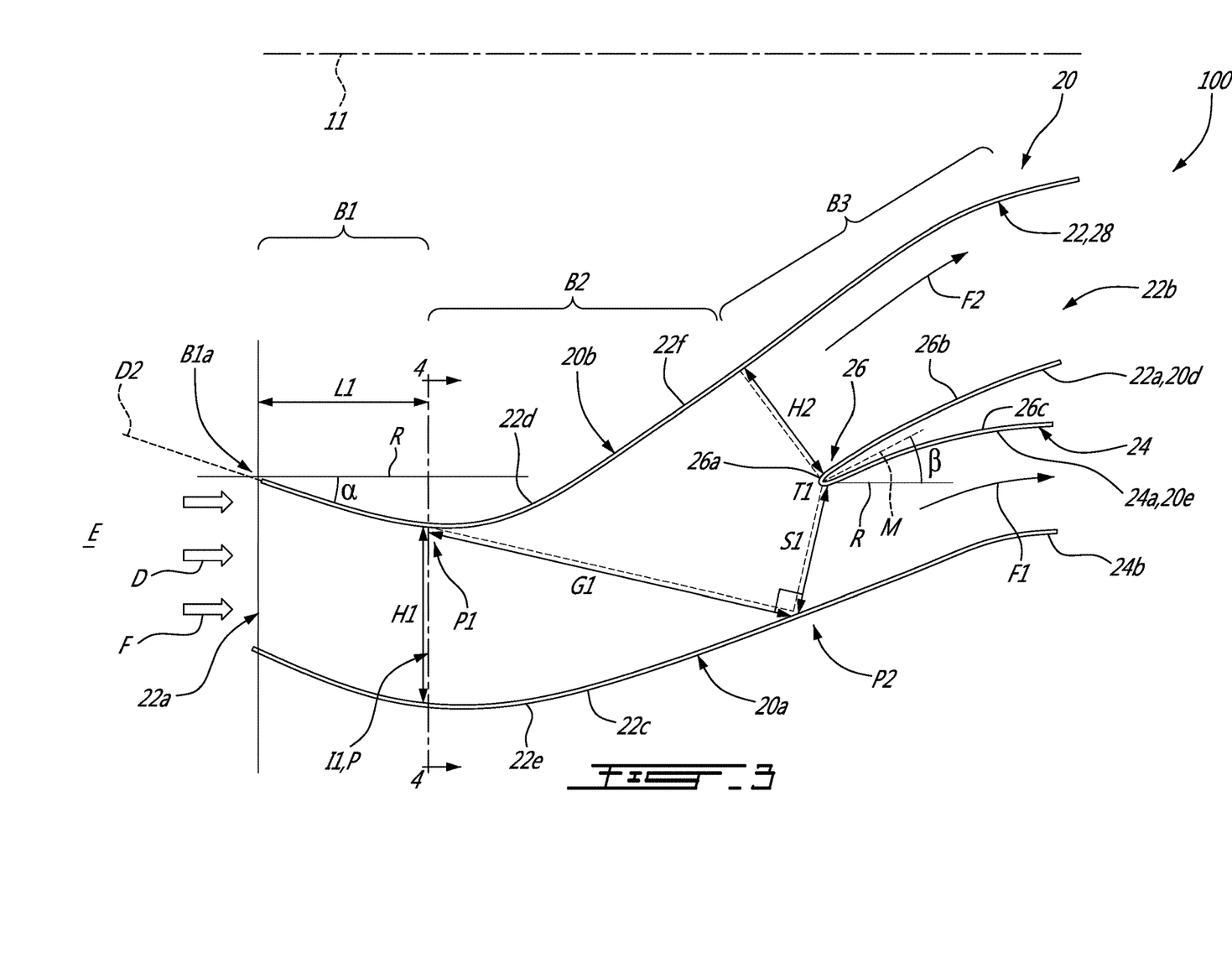
FIG. 3 is a cross-sectional view of the inertial particle separator of FIG. 2 along line 3-3 on FIG. 2.
Figure 4:
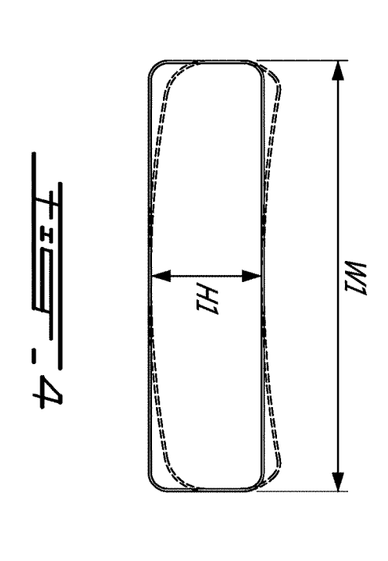
FIG. 4 is cross-sectional view of the inertial particle separator of FIG. 2 along line 4-4 on FIG. 3.

Referring now to FIGS. 2-4, an inertial particle separator, referred to herein below as a separator, is generally shown at 100. The separator 100 is configured to be installed upstream of the compressor section 14 and downstream of an air intake (not shown) of a vehicle (e.g. an aircraft) containing the gas turbine engine 10. The inertial particle separator 100 has a duct body 20 that is made of a carefully designed serpentine shape. The duct body 20 is configured to impart movement to an ambient air flow F providing from the environment E outside of the gas turbine engine 10 such that the particles contained therein are not able to follow and, by inertia, separate from the air. In other words, the particles, which are heavier than the air, are not able to negotiate every curves imposed by the separator 100 and may be separated from the air. The specific shape of the disclosed separator is described herein below.

The main components of the duct body 20 are a main duct 22, a bypass duct 24, and a splitter 26. In the embodiment shown, the main duct 22 has an inlet 22a fluidly connected to the environment E outside the gas turbine engine 10 and an outlet 22b fluidly connected to an engine inlet I (FIG. 1) for feeding air to the compressor section 14. The main duct 22 is configured for receiving the ambient air flow F. Depending of the operating conditions of the gas turbine engine 10 (e.g., altitude, temperature), the ambient air flow F may contain particles. The splitter 26 is configured for separating the ambient air flow F in a flow of particles F1 and an air flow F2. The bypass duct 24 is configured for receiving the flow of particles F1 extracted from the ambient air flow F. The air flow F2 is circulated to the compressor section 14 of the gas turbine engine 10 via the main duct 22 and the engine inlet I. It is understood that the air flow F2 is not necessarily free of particles and that a particle concentration of the air flow F2 may be less than that of the ambient air flow F entering the duct body 20.

Referring more particularly to FIG. 3, in the embodiment shown, the duct body 20 has an outer wall 20a that is radially spaced apart from the centerline 11 and an inner wall 20b that is located radially between the outer wall 20a and the centerline 11. In the embodiment shown, the outer and inner walls 20a, 20b extend partially circumferentially around the centerline 11. It is understood that the outer and inner walls 20a, 20b may extend circumferentially 360 degrees around the centerline 11 such that the duct body 20 is annular without departing from the scope of the present disclosure. In the depicted embodiment, circumferential ends of the outer and inner walls 20a, 20b meet to define side walls 20c of the duct body 20. The main duct 22 has a first side 22e facing away from the axis 11 and a second side 22f opposed to the first side 22e and facing toward the axis 11.

In the depicted embodiment, the duct body 20 has three segments, referred to herein as a first segment B1, a second segment B2, and a third segment B3, that are in serial flow communication. The main duct 22 extends along the three segments B1, B2, B3 of the duct body 20. The main duct 22 has an outer wall 22c, which corresponds to the duct body outer wall 20a, and an inner wall 22d, which corresponds to the duct body inner wall 20b along the first and second segments B1, B2 and to an interior inner wall 20d of the duct body 20 along the third segment B3. As shown in FIG. 3, the inner wall 20b is smooth and continuous from the first segment B1 to the second segment B2. In other words, the inner wall 20b is free of a step at its radially-outward-most section, which is located at an intersection between the first and second segments B1, B2. As explained below, a plurality of parameters of the inertial particle separator 100 allows the inner wall 20b to be free of a step at its radially-outward-most section.

The bypass duct 24 extends from the main duct 22 at an intersection located between the main duct inlet 22a and outlet 22b. In other words, the bypass duct 24 stems from the main duct 22. The bypass duct 24 is located at the duct body third segment B3. The bypass duct 24 has an inner wall 24a that corresponds to an interior outer wall 20e of the duct body 20 along the third segment B3. The bypass duct 24 has an outer wall 24b that corresponds to the duct body outer wall 20a at the third segment B3. The bypass duct 24 is configured for evacuating the separated particles away from the gas turbine engine 10. In the depicted embodiment, the bypass duct 24 is fluidly connected to the environment E outside the gas turbine engine 10 without going through (i.e. bypassing) the compressor section 14, the combustor 16, and the turbine section 18.

A cooperation of the duct body interior inner and outer walls 20d, 20e defines the splitter 26. The first and second segments B1, B2 of the duct body 20 are located upstream of the splitter 26. The splitter 26 has a leading edge 26a that is defined by the intersection of the bypass duct inner wall 24a and a portion of the main duct outer wall 22a that is located at the third segment B3. A portion of the main duct 22 that is located at the duct body third segment B3 corresponds to an air inlet duct 28 that is fluidly connected to the engine inlet I of the gas turbine engine 10.

In the depicted embodiment, the main duct 22 separates in two such that the air inlet duct 28 includes two air inlet sub-ducts 28a that may be mirror images of one another. The two air inlet sub-ducts 28a may be fluidly connected to the engine inlet I at respective circumferential locations. The main duct 22 and the two sub-ducts 28a define a "Y"-shape. Each of the two sub-ducts 28a may be fluidly connected to a plenum that is fluidly connected to the engine inlet I. The plenum may allow uniform air distribution to the compressor section 14. In the depicted embodiment, the bypass duct 24 extends from a point where the main duct 22 separates in the two sub-ducts 28a.

Now that the different components of the inertial particle separator 100 have been set forth, the particular shape of these components is described herein below with reference more particularly to FIG. 3.

The specific shape of the first and second segments B1, B2 of the duct body 20 may allow imparting a movement to the ambient air flow F in such a way that the particles contained therein are not able to follow the air in which they are in suspension. Such a movement might result in the particles following a different direction than the air of the ambient air flow F thereby allowing their extraction from the ambient air flow F upstream of the compressor section 14. In the embodiment shown, the separator 100 is shaped to successively deviate the ambient air flow F entering therein toward and away from the centerline 11 of the gas turbine engine 10.

In the depicted embodiment, the duct body 20 directs the flow F away from the centerline 11 in the first segment B1 and toward the centerline 11 in the second segment B2. More specifically, and in accordance with the illustrated embodiment, at an upstream end B1, of the first segment B1, an angle α between the duct body inner wall 20b and a reference line R that is defined by a direction D of the flow F entering the duct body 20 ranges from 0 to 45 degrees. In other words, the second side 22f of the main duct 22 at the inlet 22a extends from said inlet along a second direction D2 that defines the angle α. It is noted that herein a positive angle means that the angle is measured from the reference line R in a clockwise direction. Preferably, the angle α ranges from 0 to 20 degrees.

Referring to FIGS. 3 and 4, the flow F continues flowing within the duct body first segment B1 until it reaches an interface I1 between the first and second segments B1, B2. This interface I1 is defined by a plane P that perpendicularly intersects the reference line R. At this interface I1, a cross-section of the duct body 20 has a height H1 and a width W1. In the embodiment shown, W1/H1≥0.5. Preferably, W1/H1≥2. A length L1 of the first segment taken in a direction parallel the reference line R is such that L1/H1≥0.5. Preferably, L1/H1≥1. As shown in FIG. 3, the interface I1 defines a radially outward-most section of the main duct 22. A distance between the axis 11 and the main duct 22 is maximum at the radially outward-most section of the main duct 22. The length L1 extends from the inlet 22a of the main duct 22 to the radially outward-most section along the direction D.

The cross-section between the first and second segments B1, B2 at the interface I1 may have a rectangular shape (solid line in FIG. 4) or may have an arcuate shape (tiered line in FIG. 4) such that the inner and outer walls 20a, 20b are curves that may be circle arcs.

Referring back to FIG. 3, the flow F passes the interface I1 and flows along the second segment B2 that has a length G1. The length G1 is defined from a first point P1 located on the duct body inner wall 20b at the interface I1 between the first and second segments B1, B2 and a second point P2 that is located on the outer wall 20a. The length G1 is taken along a direction parallel to the duct body inner wall 20b at the first segment upstream end B1$_a$. Stated otherwise, the length G1 extends along the second direction D2. In other words, the second point P2 is defined by an intersection of an imaginary line and the duct body outer wall 20a; the imaginary line being created by projecting, on the outer wall 20a, the first point P1 along a direction that is parallel to the duct body inner wall 20b at the first segment upstream end B1$_a$. In the embodiment shown, G1/H1≥1. Preferably, the G1/H1≥2.

At which point, the flow reaches the leading edge 26a of the splitter 26 where the ambient air flow F might separate in the air flow F2 and the flow of particles F1. The splitter 26 has an inner splitter wall 26b and an outer splitter wall 26c that correspond respectively to the duct body interior inner and outer walls 20d, 20e. In the embodiment shown, an upstream end of the splitter 26 is rounded and has a diameter of at least 0.15 inch, preferably of at least 0.25 inch.

A mid-plane M of the splitter 26 is located between the splitter inner and outer walls 26b, 26c and intersects the leading edge 26a. In the embodiment shown, a splitter angle β between the splitter mid-plane M and the reference line R is at least −60 degrees and at most 60 degrees. Preferably, the splitter angle β ranges from −30 to 30.

The flow of air F2 is directed in the air inlet duct 28. A height H2 of the air inlet duct 28, which corresponds to the height of the main duct at the third segment B3, is defined between the splitter leading edge 26a and the duct body inner wall 20b and extends perpendicularly to both the duct body inner wall 20b and the splitter inner wall 26b. In the depicted embodiment, the air inlet duct 28 height H2 is at most four times the height H1 of the cross-section between the first segment B1 and the second segment B2. Stated otherwise, H2/H1≤4. Preferably, H2/H1≤2.

The flow of particles F1 is directed toward the bypass duct 24. The bypass duct 24 has a height S1 defined from the second point P2 on the duct body outer wall 20a and the splitter leading edge 26a. Stated otherwise, the height S1 extends from the first side 22e of the main duct 22 at an end of the length G1 to the leading edge 26a of the splitter 26. The end of the length G1 corresponds to the second point P2. In the depicted embodiment, the bypass duct height S1 is at least 20% of the height H1 of the cross section between the first and second segments B1, B2 of the duct body 20. Stated otherwise, S1/H1≥0.2. Preferably, S1/H1≥0.5.

Figure 5:
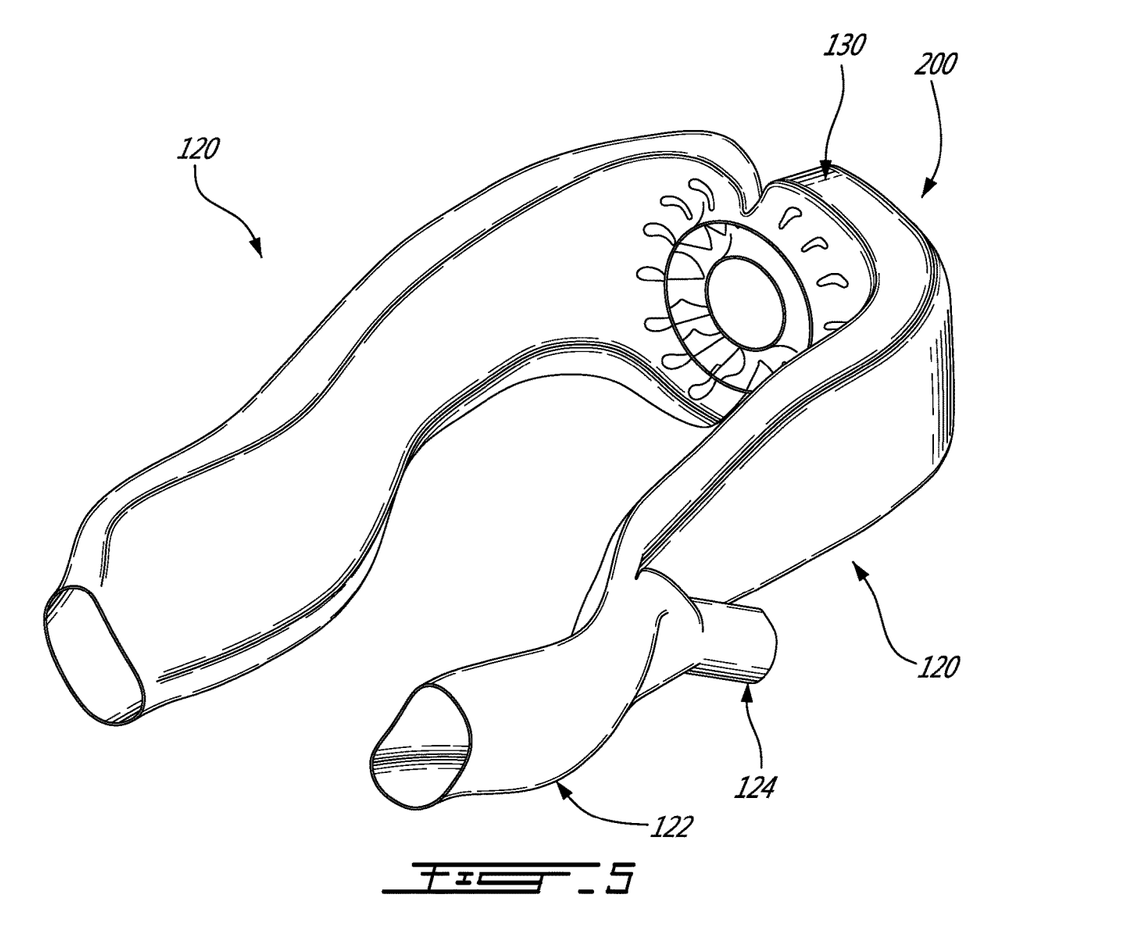
FIG. 5 is a schematic oblique view of an air inlet having an inertial particle separator in accordance with another embodiment.

Referring now to FIG. 5, another embodiment of an inertial particle separator is shown generally at 200. For the sake of conciseness, only elements that differ from the separator of FIGS. 2-4 are discussed herein below.

The separator 200 includes two duct bodies 120 that are each fluidly connected to a plenum 130; the plenum 130 being in fluid flow communication with the engine inlet I (FIG. 1). One of the two duct bodies 120 may be a mirror image of the other. Each of the two duct bodies 120 has a main duct 122 and a bypass duct 124 that extends from the main duct 122. Each of the main ducts 122 has a first segment, a second segment, and a third segment. Dimensions of the first, second, and third segments may be similar to the first and second segments of the separator 100 described herein above with reference to FIGS. 1-4. However, the third segment of the separator 200 differs from the third segment B3 of the separator 100 of FIGS. 1-3 as it does not separate in two sub-ducts 28a.

For separating particles in the engine inlet of the aircraft engine a flow of ambient air in an incoming direction is received from the environment E in a duct 22. The flow is directed away from a centerline 11 of the aircraft engine 10 in the second direction D2 defining the angle (a) of at most 45 degrees with the incoming direction D up to a radially outward-most section of the duct 22 where the width (W1) is at least 50% of the height (H1) thereof. The flow is directed toward the centerline 11 from the radially outward-most section of the duct 22 along a portion of the duct having the length (G1) taken along the second direction D2 thereby separating the flow in an air flow and a particle flow via inertia. The length (G1) extends from the radially-outward most section at a side of the duct facing the centerline 22f to an opposed side 22e of the duct 22 facing away from the centerline 11, and being at least as great as the height (H1). The air flow is directed in an air inlet duct 28 having the height (H2) being at most 4 times the height (H1) of the duct 22 at the radially-outward most section. The particle flow is directed in the bypass duct 24 having the height (S1) being at least 20% of the height (H1) at the radially-outward most section of the duct 22 and being defined from and end P2 of the length (G1) to a location where the flow is separated in the air flow and the particle flow.

In the embodiment shown, deviating the flow away from the centerline 11 includes deviating the flow along a length (L1) of the first segment, wherein L1/H1≥0.5.

In the embodiment shown, directing the flow toward the centerline 11 from the radially outward-most section includes directing the flow toward the centerline 11 from the radially outward-most section along the length (G1) being at least twice as great as the height (H1).

In a particular embodiment, the disclosed inertial particle separators allows delivering the flow of air to the engine inlet with low distortion and low pressure losses. The disclosed separator may be always operative. In a particular embodiment, a weight of the separator is less than that of separators having actuatable vanes. The above might be achieved by the use of the serpentine duct between the engine air intake and the engine inlet. In a particular embodiment, the serpentine duct is designed to have minimal losses under all conditions while protecting the engine against foreign object ingestion. In a particular embodiment, an integration of the duct body to the duct/plenum is optimized to minimize losses and distortion.

In a particular embodiment, the inertial separator does not require any special features within the duct body to efficiently separate the particles from the air in which they are contained. Still in accordance with a particular embodiment, the inertial separator is able to separate supercooled icing droplets entering the engine inlet of the gas turbine engine (e.g., turboprop, turboshaft).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An inertial particle separator configured for communicating with an engine inlet of an aircraft engine having an axis, the inertial particle separator comprising:
    a main duct having an inlet fluidly connected to an environment outside of the aircraft engine and an outlet configured for being fluidly connected to the engine inlet, the main duct having a first side facing away from the axis and a second side opposed to the first side and facing toward the axis, the inlet for receiving an airflow from the environment along a first direction;
    a bypass duct stemming from the main duct between the inlet and the outlet, the bypass duct being fluidly connected to the main duct; and
    a splitter defined by an intersection of the main duct and the bypass duct, the splitter having a leading edge,
    wherein the second side of the main duct at the inlet extends from the inlet along a second direction defining an angle ($\alpha$) of at most 45 degrees with the first direction,
    wherein, the main duct has a radially outward-most section between the inlet and the splitter, the radially-outward most section having a height (H1) extending from the first side to the second side and a width (W1), wherein W1/H1≥0.5, the second side of the main duct free of a step at the radially-outward-most section,
    wherein a length (G1) from the second side to the first side and from the radially-outward most section along a direction parallel to the second direction is at least as great as the height (H1) of the main duct at the radially outward-most section,
    wherein a height (H2) of the main duct from the leading edge of the splitter and the second side of the main duct is at most four times the height (H1) of the main duct at the radially outward-most section, and
    wherein a height (S1) of the bypass duct from the first side at an end of the length (G1) to the leading edge is at least 20% of the height (H1) of the main duct at the radially outward-most section.

2. The inertial particle separator of claim 1, wherein an upstream end of the splitter is rounded and has a diameter of at least 0.15 inch.

3. The inertial particle separator of claim 1, wherein the splitter has a mid-plane located between the main duct and the bypass duct, a splitter angle ($\beta$) being defined between the mid-plane and the first direction is at least −60 degrees and at most 60 degrees.

4. The inertial particle separator of claim 3, wherein the splitter angle is at least −30 degrees and at most 30 degrees.

5. The inertial particle separator of claim 1, wherein the main duct at the radially outward-most section is substantially rectangular in cross-section.

6. The inertial particle separator of claim 1, wherein the first side and the second side of the main duct at the radially outward-most section are curved.

7. The inertial particle separator of claim 1, wherein G1/H1≥2.

8. The inertial particle separator of claim 1, wherein the angle ($\alpha$) is at least 0 degree and at most 20 degrees.

9. The inertial particle separator engine of claim 1, wherein the main duct separates into two sub-ducts extending away from one another in a circumferential direction relative to a central axis of the aircraft engine, each of the two sub-ducts connected to the engine inlet, the bypass duct extending from a point where the main duct separates in the two sub-ducts, the bypass duct extending between the two sub-ducts.

10. The inertial particle separator of claim 1, wherein H2/H1≤2, and wherein the main duct has a second length (L1) from the inlet to the radially outward-most section along the first direction, wherein L1/H1≥0.5.

11. An aircraft engine having an inertial particle separator communicating with an engine inlet of the aircraft engine, the inertial particle separator comprising:

a main duct having an inlet fluidly connected to an environment outside of the turboprop or turboshaft gas turbine engine and an outlet configured for being fluidly connected to the engine inlet, the main duct having an inner main duct wall and an outer main duct wall spaced apart from the inner main duct wall;

a bypass duct stemming from the main duct between the inlet and the outlet, the main duct being fluidly connected to the main duct, the bypass duct having an inner bypass duct wall and an outer bypass duct wall; and a splitter defined by an intersection of the outer main duct wall and the inner bypass duct wall, the splitter having a leading edge, wherein the main duct has a first segment, a second segment, and a third segment in serial flow communication, the first segment and the second segment being located upstream of the splitter relative to a flow of air through the main duct, the bypass duct located in the third segment, wherein, at an upstream end of the first segment, an angle ($\alpha$) between the inner main duct wall and a reference line defined by a direction of an airflow entering the main duct ranges from 0 to 45 degrees, wherein, a cross-section of the main duct taken in a plane perpendicularly intersecting the reference line and located at an interface between the first segment and the second segment is characterized by a height (H1) and a width (W1), wherein W1/H1≥0.5, the inner main duct wall free of a step at the interface between the first segment and the second segment, wherein a length (G1) of the second segment is defined from a first point located on the inner main duct wall at the interface between the first segment and the second segment and a second point located on the outer main duct wall, the length taken along a direction parallel to the inner main duct wall at the upstream end of the first segment, wherein G1/H1≥1.0;

wherein a height (H2) of the main duct at the third segment is defined between the leading edge and the inner main duct wall, the height (H2) extending perpendicularly to both of the splitter to the inner main duct wall, wherein H2/H1≤4, wherein a height (S1) of the bypass duct is defined from the second point and the leading edge of the splitter, wherein S1/H1≥0.2.

12. The turboshaft or turboprop gas turbine engine of claim 11, wherein an upstream end of the splitter is rounded and as a diameter of at least 0.15 inch.

13. The turboshaft or turboprop gas turbine engine of claim 11, wherein the splitter has a mid-plane located between the outer main duct wall and the inner bypass duct wall, a splitter angle ($\beta$) being defined between the mid-plane and the reference line is at least −60 degrees and at most 60 degrees.

14. The turboshaft or turboprop gas turbine engine of claim 11, wherein the main duct separates into two sub-ducts extending away from one another in a circumferential direction relative to a central axis of the aircraft engine, each of the two sub-ducts connected to the engine inlet, the bypass duct extending from a point where the main duct separates in the two sub-ducts, the bypass duct extending between the two sub-ducts.

15. The turboshaft or turboprop gas turbine engine of claim 11, wherein the cross-section between the first segment and the second segment has a rectangular shape.

16. The turboshaft or turboprop gas turbine engine of claim 11, wherein G1/H1≥2.

17. The turboshaft or turboprop gas turbine engine of claim 11, wherein the first segment has a length (L1) taken along an axis parallel the reference line, wherein L1/H1≥0.5.

18. A method of separating particles in an engine inlet of an aircraft engine, comprising:

receiving a flow of ambient air in an incoming direction from an environment in a duct;

directing the flow away from a centerline of the aircraft engine in a second direction defining an angle ($\alpha$) of at most 45 degrees with the incoming direction up to a radially outward-most section of the duct where a width (W1) is at least 50% of a height (H1) thereof;

directing the flow toward the centerline from the radially outward-most section of the duct along a portion of the duct having a length (G1) taken along the second direction thereby separating the flow in an air flow and a particle flow via inertia, the length (G1) extending from the radially-outward most section at a side of the duct facing the centerline to an opposed side of the duct facing away from the centerline, and being at least as great as the height (H1), the directing of the flow toward the centerline includes flowing the flow along a wall of the duct, the wall being free of a step;

directing the air flow in an air inlet duct having a height (H2) being at most 4 times the height (H1) of the duct at the radially-outward most section; and directing the particle flow in a bypass duct having a height (S1) being at least 20% of the height (H1) at the radially-outward most section of the duct and being defined from and end of the length (G1) to a location where the flow is separated in the air flow and the particle flow.

19. The method of claim 18, wherein deviating the flow away from the centerline includes deviating the flow along a length (L1) of the first segment, wherein L1/H1≥0.5.

20. The method of claim 18, wherein directing the flow toward the centerline from the radially outward-most section includes directing the flow toward the centerline from the radially outward-most section along the length (G1) being at least twice as great as the height (H1).

* * * * *